May 23, 1967  E. GOLDBAUM ETAL  3,321,618
AUTOMOTIVE VEHICLE LAMP WITH SNAP-IN LENS
Filed Oct. 9, 1964  2 Sheets-Sheet 1
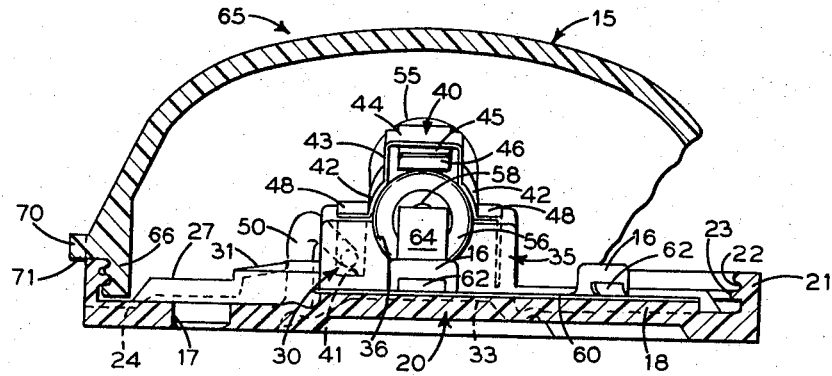
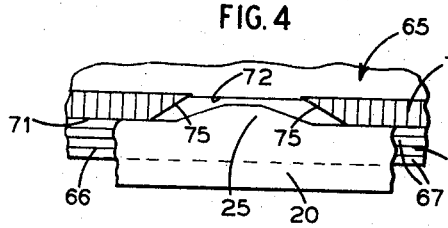
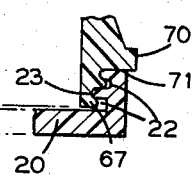
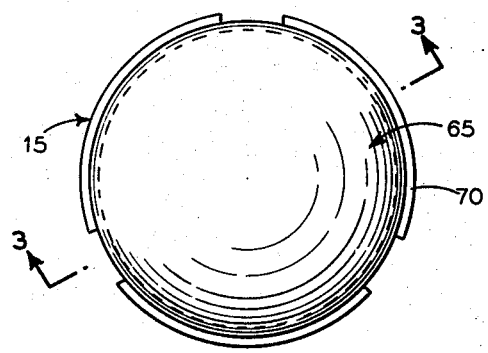
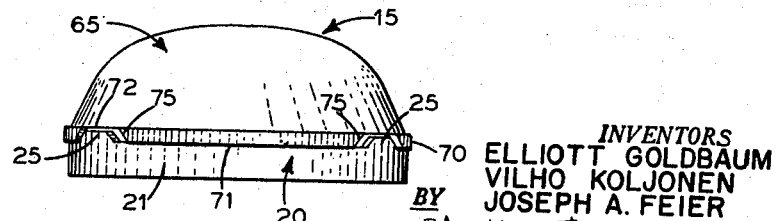
INVENTORS
ELLIOTT GOLDBAUM
VILHO KOLJONEN
JOSEPH A. FEIER
BY Blum, Moscovitz, Friedman,
Blum & Kaplan
ATTORNEYS May 23, 1967   E. GOLDBAUM ET AL   3,321,618
AUTOMOTIVE VEHICLE LAMP WITH SNAP-IN LENS
Filed Oct. 9, 1964                               2 Sheets-Sheet 2
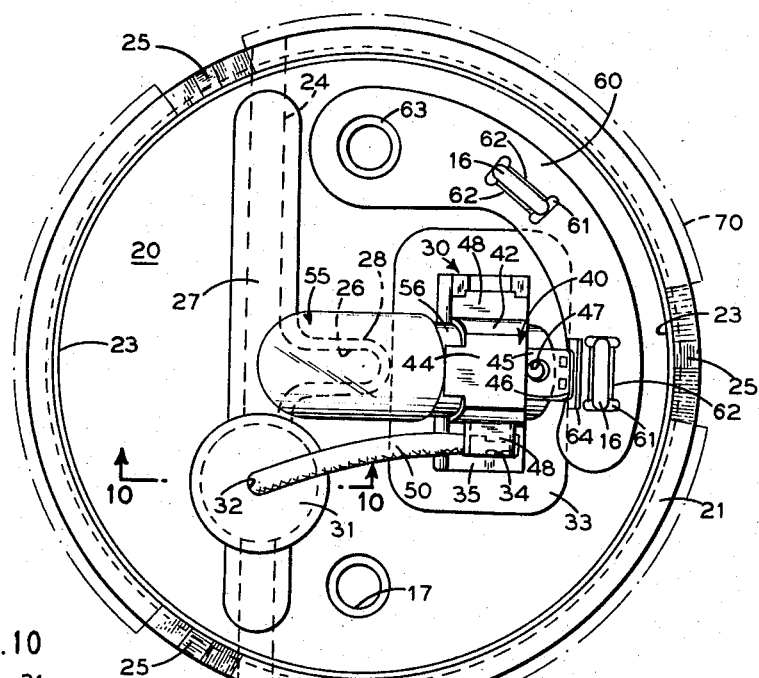
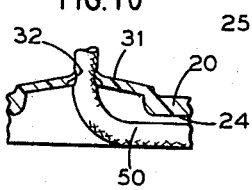
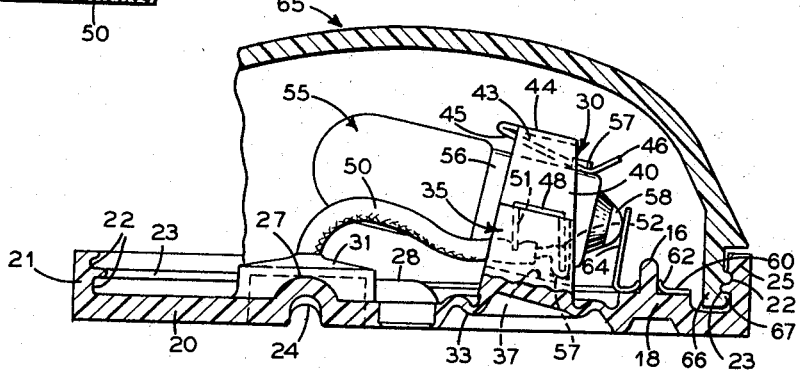
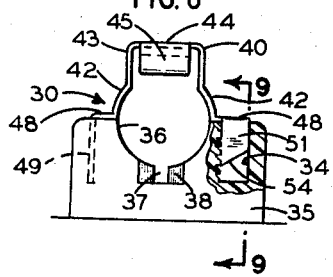
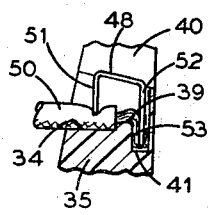
*INVENTORS*
ELLIOTT GOLDBAUM
VILHO KOLJONEN
BY JOSEPH A. FEIER
ATTORNEYS

United States Patent Office 3,321,618
Patented May 23, 1967

3,321,618
AUTOMOTIVE VEHICLE LAMP WITH SNAP-IN LENS
Elliott Goldbaum and Vilho Koljonen, Brooklyn, N.Y., and Joseph A. Feier, Newark, N.J., assignors to Lehigh Valley Industries, Inc., New York, N.Y., a corporation of Delaware
Filed Oct. 9, 1964, Ser. No. 402,719
9 Claims. (Cl. 240—8.2)

This invention relates to automotive vehicle lamps, and more particularly to a novel marker lamp characterized by an easily removable and replaceable lens and novel, simplified, and economical construction of internals incorporating means for isolating the lamp bulb from shocks and means for quick removal of the lamp bulb.

Marker lamps for automotive vehicles, particularly commercial vehicles, are mounted on the exterior of the vehicle and usually comprise a mounting base, a lens, and a gasket interposed between the lens and the base in order to provide a seal against the entry of moisture into the interior of the lamp. Various other seals are also provided where conductors enter through the base and into the lamp interior, again to prevent the entrance of moisture into the lamp with its resulting deleterious effect upon the lamp bulb and socket.

When it is necessary to change a lamp bulb in such a lamp, the lens must be removed in order to obtain access to the bulb. Frequently, the lens is held in position by one or more screws, which requires the use of a screwdriver in order to remove the lens. Other arrangements have involved a pressure fit of the lens in the housing whereby the lens may be removed by prying upwardly or outwardly with a screwdriver. Again, however, tools are required for removal of the lens. Furthermore, the removal of screws holding the lens in place, or of screws holding a retaining rim for a lens in place, is time consuming. This is disadvantageous particularly when a lamp malfunctions during a road run of the vehicle when time is at a premium. Nevertheless, when the lamp does malfunction, it is necessary to replace the bulb as soon as it is known that the lamp is malfunctioning, or else the driver of the commercial vehicle is subject to a penalty for having improper or inoperative marking lamps on his vehicle.

Another problem involving automotive vehicle lamps is the breaking of the lamp bulb filament due to road shocks and the like to the vehicle. Various means have been proposed to isolate the lamp bulbs or their mounting sockets against such road shocks, but the means heretofore used have been relatively expensive.

The cost of automotive vehicle lamps has been rather high because of the materials used in constructing the interior of the lamp including the socket, the mounting therefor, the connections to ground and to any external leads or conductors and the use of a separate lens sealing gasket, or the like, for preventing moisture from entering the lamp. The cost of assembly of the several component parts of such a lamp has also been relatively high, and assembly has generally required the use of machinery.

In accordance with the present invention, a novel automotive vehicle marker lamp is provided in which both the base and the lens are of plastic composition material, with the base being formed of a material having some resiliency. The lens may be snapped into the base merely by pushing it into a rim extending upwardly from the base, whereupon ribs and grooves on the lens and the base interlock to form a labyrinth seal against the entry of moisture and to place the parts under both radial and axial or longitudinal tension to maintain such tight seal. The lens may then be readily removed for access to the interior of the lamp merely by rotating the lens relative to the base. When such relative rotation is imparted to the lens, cooperating cam means on the lens and on the rim of the base act to force the lens outwardly of the base sufficiently to disengage the interlocking ribs and grooves.

The plastic base has molded grooves or tunnels on its under surface in which conductors may be placed with a tight sealing fit, and at one point along these grooves there is an aperture through the base through which an insulated conductor may be drawn. This aperture is somewhat smaller than the overall diameter of the insulated conductor but, due to the resiliency of the base material, the conductor may be drawn through the aperture and there will be a tight seal between the material of the base and the insulation on the conductor. This tight seal may also act as a strain relief on the conductor.

A two-part lamp bulb socket is provided including a first part of plastic composition material which is molded integral with the base. The second part of the socket is made of metal and includes a conductor strip by means of which the lamp bulb may be grounded. This second part may be interfitted with the first part merely by pressing the metal part into the plastic part and snapping the conductor strip over upstanding ears or the like on the inner surface of the base. That portion of the base directly mounting the plastic half of the socket is relatively very thin so as to be sufficiently resilient to serve as a shock isolating mounting for the socket. The "live" conductor is clamped in place by a part of the metal socket which, at the same time, makes the necessary electrical contact with the bared end of the conductor. Cooperating means are provided on the plastic half of the socket and on the metal half thereof whereby the usual bayonet type lamp bulb may be snapped into and out of the socket, thus providing for simple and easy replacement of the lamp bulb.

For an understanding of the principles of the invention, reference is made to the following description of a typical embodiment thereof as illustrated in the accompanying drawings. In the drawings:

FIG. 1 is a plan view of an automotive vehicle marker lamp embodying the invention;

FIG. 2 is a side elevational view thereof;

FIG. 3 is a partial sectional view taken on the line 3—3 of FIG. 1;

FIG. 4 is an enlarged partial side elevation of the lamp illustrating the cam means for disengaging the lens from the base;

FIG. 5 is a plan view of the lamp base with the socket mounted therein;

FIGS. 6 and 7 are enlarged sectional views through portions of the lamp base and lens, illustrating internal details of the lamp;

FIG. 8 is an enlarged end view of the lamp bulb socket;

FIG. 9 is an enlarged sectional view illustrating the anchoring of the live conductor and its electrical connection to the metal part of the lamp socket; and FIG. 10 is an enlarged sectional view taken on the line 10—10 of FIG. 5.

Referring to the drawings, a lamp 15 embodying the invention is illustrated as including a base 20 and a lens 65. Base 20 is molded of a suitable resilient plastic composition material such as, for example, a polypropylene resin. Lens 65 is molded of a relatively stiff and rigid plastic composition material such as, for example, an acrylic resin, and is transparent. Depending upon its intended use, the color of lens 65 may be red, white, blue, amber, or green.

Base 20 is substantially flat and circular in plan, and is formed with an upstanding rim 21 around its entire periphery. On the inner side of rim 21, there are peripheral grooves 22 between which is a peripheral rib 23, for a purpose to be described. At equispaced points around the periphery of the base, the upper surface of rim 21 of base 20 is formed with cams 25, having, for example, a trapezoidal configuration as illustrated. Also, as illustrated there are three cams 25 spaced 120 degrees apart. Base 20 is formed with a tunnel 24 extending chordially thereof, and a short radial tunnel 26 intersects tunnel 24 and extends to the center of the base. The tunnels 24 and 26 are molded as grooves in the under surface of base 20 and as hollow ribs 27 and 28 on the upper surface of the base. By means of these tunnels, a conductor may be led out in either direction from the base or may be led out centrally therefrom.

A short distance from one end, tunnel 24 intersects a circular recess opening into the under surface of base 20 and appearing as a thin wall boss or circular enlargement 31 on the upper surface of the base. This boss 31 is formed with a small aperture 32 therein where the material forming the upper wall of the boss is even further thinned. Adjacent the inner end of short wire tunnel 26, base 20 is formed with a relatively thin wall area 33 which may, for example, be substantially rectangular. This resilient thin wall portion 33 acts as a shock isolating or shock absorbing mounting for the lamp socket generally indicated at 30.

Socket 30 includes a plastic section or half socket 35, which is molded integrally with area 33 of base 20, and a metal section generally indicated at 40 and forming the other or upper half of the socket. The plastic socket half 35 is a generally block shaped member extending up from the thinned wall portion 33. This section 35 is formed with a semicylindrical recess in its upper surface which is tilted somewhat rearwardly, as viewed in FIG. 6. As best seen in FIG. 8, a longitudinal slot 37 extends from the lower surface of recess 36 and has a flared entry throat 38. At one side of recess 36, there is an upwardly opening substantially rectangular slot 34 formed in the socket half 35, and a shoulder 39 formed at the inner end of slot 34. Beyond shoulder 39, there is a deeper recess or well 41.

The metal socket half 40 may be formed of any suitable electrically conductive metal such as, for example, brass. Socket half 40 includes circular wall sections 42 forming continuations of semicylindrical recess 36. An inverted channel shape section 43 interconnects the inner ends of circular wall section 42 and the base 44 of channel shape section 43 is spaced substantially above the inner ends of curved wall portions 42. A contact spring 45 extends outwardly from wall 44 and is then bent backwards as best seen in FIG. 6, to extend rearwardly of portion 40 of the socket. Spring 45 has an upturned inner end 46 formed with an aperture 47 to receive a base pin 57 of a bayonet type lamp bulb.

Horizontal shelf portions 48 extend outwardly from the outer ends of each of the curved wall portions 42, and are arranged to rest upon the flat upper surface of the plastic socket half 35. One shelf 48, the left shelf as viewed in FIG. 8, has a vertical leg 49 extending downwardly therefrom and formed with serrations along its edges. As best seen in FIG. 9, the other shelf 48 has a pair of legs 51 and 52 extending downwardly therefrom and formed with serrations along its edges. The serrations cooperate with the slots to retain the legs therein. Leg 51 has a bevelled lower end 54, as best seen in FIG. 8, and is arranged to crimp the insulation of a conductor 50 laid into slot 34 with its insulation abutting shoulder 39 and a bared end 53 extending downwardly into the recess 41. This bared end is arranged to be contacted, for electrical contact, by the leg 52. Both legs 51 and 52 have serrations or teeth along their narrow edges.

In assembling socket 30, conductor 50 is pulled through aperture 32 in boss 31, with the material of this boss exerting a tight grip upon the insulation of the conductor to form a water-tight seal and also to act as a strain relief means between the socket and the exterior of the lamp. The end of conductor 50 is bared, as at 53, and the conductor is laid into slot 34 until its insulation abuts shoulder 39. At this time, bared end 53 will extend across recess 41. Metal socket half 40 is assembled to plastic socket half 35 merely by placing legs 51 and 52 into the slots 34 and the recess 41, and the leg 49 against the upper surface of plastic socket half 35. The legs are then pushed into place manually by pressure upon socket member 40. Upon such inward pressing of socket half 40, leg 51 will engage and crimp the insulation of conductor 50, and leg 52 will bend a loop of bared wire end 53 into recess 41 with a tight fit so as to make good electrical contact between bared wire end 53 and leg 52, thus forming the "live" connection to socket half 40.

Lamp socket 30 is arranged to receive a lamp bulb 55 having a metal base 56 provided with pins 57 and a central contact 58. The lamp bulb is easily inserted into the socket by engaging one pin 57 in groove or slot 37, this being facilitated by flared throat 38. As the lamp is pushed in, the other pin 57 will be aligned with aperture 47 in spring contact 45, and, after a certain amount of inward movement, this pin 57 will snap into such aperture. This establishes electrical contact betwen conductor 50 and the side of base 56.

The other electrical contact to the lamp, which is preferably the grounded contact, is established through center contact 58 of the lamp bulb. For this purpose, there is provided the generally arcuate contact strip 60 arranged to extend partly around the inner periphery of base 20. Base 20 is formed with a generally arcuately extending raised shelf 18 which extends somewhat above the general upper level of base 20 and which is in the form of a channel shape rib by virtue of the undersurface of base 20 being hollowed out along the line or area of shelf 18. Shelf 18 has a pair of ears or lugs 16 projecting upwardly therefrom, and these ears or lugs engage through slots 61 in contact strip 60. Slots 61 are formed in such a manner as to provide a pair of upwardly converging fingers 62 which are arranged to grip and lock with lugs or ears 16.

Plastic base 20 is also formed with a pair of counterbored mounting screw receiving apertures 17 which are located near opposite ends of a common diameter. Contact strip 60 is formed with an aperture 63 arranged to communicate with one of the apertures 17. Consequently, contact strip 60 may be assembled with plastic base 20 merely by pressing contact strip 60 into place, with fingers 62 allowing the ears or lugs 16 to pass upwardly through strip 61 but thereafter digging into ears or lugs 16 to prevent disengagement. Grounding of the lamp through strip 60 is effected by insertion of a mounting screw through the apertures 63 and 17, this mounting screw having a grounding contact with contact strip 60. The contact screw is thus in grounding contact with the screw 60 and even more firmly anchors contact strip 60 to lamp base 20. At its end remote from aperture 63, contact strip 60 is formed with an upstanding spring finger 64 which is arranged to have resilient pressure contact against center contact 58 of base 56 of lamp bulb 55. The positioning and disposition of parts is such that, as lamp bulb 55 is pushed into place to engage upper pin 57 in aperture 47 of contact spring 45, contact spring finger 64 will be resiliently biased backward. To release lamp bulb 55 from socket 30, it is merely necessary to manually lift finger 46 of contact spring 45 to disengage aperture 47 from the upper pin 57 of lamp bulb base 56. Thereupon, the pressure of spring finger 64 will push lamp bulb 55 outwardly of socket 30 for easy removal of the lamp bulb therefrom.

Lens 65 is a generally dome shaped member of transparent or translucent plastic composition material such as the aforementioned acrylic resin. The lens has a rim portion 66 arranged to fit within rim 21 of base 20, with a resilient and snap action fit. For this purpose, the exterior surface of rim portion 66 is formed with a pair of ribs 67 separated by a groove 68. When lens 65 is pressed into base 20, groove 68 of the lens has a resilient fit with rib 23 of the base, and ribs 67 of the lens extend on either side of rib 23, and ribs 67 enter into grooves 22 of the base. Due to the resilient nature of base 20, there is a radial and axial compression effect of rim 21 of the base on rim portion 66 of lens 65, thus forming a water-tight dust-proof labyrinthine seal between base 20 and lens 65.

Outwardly of rim portion 66, lens 65 is thickened to provide a shoulder 71 which, when the lens is interlocked with the base fits against the flat upper surface of rim 21 of base 20. A substantially rectangular cross section flange 70 extends around almost the entire periphery of the rim portion of the lens, the under-surface of this flange forming a continuation of shoulder 71. The outer surface of flange 70 is preferably knurled or otherwise formed to provide a good gripping surface. At arcuate portions centered with respect to cams 25 of rim 21 of base 20, shoulder 71 is formed with cam surfaces 75 co-operating with cams 25 on base 20.

To remove lens 65 from base 20, it is merely necessary to grasp the rim of flange 70 and rotate lens 65 relative to base 20. This will engage cam surfaces 75 with co-operating cam surfaces 25 and, upon continued rotation, the inter-engagement thereof will lift lens 65 away from base 20 and disengage rim portion 66 of the lens from rim 21 of base 20. Lens 65 may then merely be lifted off, providing access to the interior of the lamp. Thus, no screwdrivers, coins, or the like are required to disengage lens 65 from base 20. However, it will be noted that there is a shoulder portion 72 at each cam 75 of lens 65, as best seen in FIGS. 3 and 4. This shoulder portion is spaced in relation to the upper surface of the associated cam portions 25. Consequently, a screwdriver blade or a coin may be inserted between a shoulder 72 and a flat upper surface of a cam portion 25 to pry lens 65 from base 20 if necessary or desirable.

Due to its resilience and flexibility, base 20 forms a good seal with a mounting surface to which the base may be secured by mounting screws inserted through apertures 17 and 63. Consequently, no sealing gasket is needed for the lamp, thus further contributing to the economy of installation of the lamp. The pressure between aperture 63 in strip 60 and associated counter-bored recess 17 in base 20, when a mounting screw is driven home therethrough, further provides a seal at this point, and a seal at the other aperture 17 is likewise provided by virtue of the resiliency of the material as compressed by driving home the mounting screw. The lamp is further sealed by the crimping or sealing action of the rim of aperture 32 of boss 31 on the insulation of the conductor 50. Thus, a tightly sealed construction is provided.

While a specific embodiment of the invention has been shown and described in detail to illustrate the application of the principles of the invention, it will be understood that the invention may be embodied otherwise without departing from such principles.

What is claimed is:

1. An automotive vehicle lamp comprising a base having a substantially cylindrical upstanding portion, a lens having a substantially cylindrical downwardly extending rim portion, said upstanding portion and said rim portion overlying one another in the assembled position, said overlying portions being provided with interengaging ribs forming a labyrinthine seal between said lens and said base, at least one of said overlying portions being formed of a relatively resilient material to permit disengaging deflection thereof on the application of an axial force, and means for applying a disengaging axial force to said base and lens on rotation of said lens relative to said base, said last-named means comprising a cam surface on said base and a cooperating cam surface on said lens.

2. An automotive vehicle lamp comprising a base having a substantially cylindrical upstanding portion, a lens having a substantially cylindrical downwardly extending rim portion, said upstanding portion and said rim portion overlying one another in the assembled position, said overlying portions being provided with radially extending interengaging ribs forming a labyrinthine seal between said lens and said base, at least one of said overlying portions being formed of a relatively resilient material to permit disengaging deflection thereof on the application of an axial force, and to apply compressive forces holding said ribs in interengagement when said lens and base are assembled, and means for applying a disengaging axial force to said base and lens on rotation of said lens relative to said base, said last-named means comprising a cam surface on said base and a cooperating cam surface on said lens.

3. An automotive vehicle lamp comprising a base having a substantially cylindrical upstanding portion, a lens having a substantially cylindrical downwardly extending rim portion, first sections of said upstanding portion and said rim portion overlying one another in assembled position, second sections of said upstanding portion and said rim portion abutting one another in the assembled position, said overlying sections being provided with interengaging ribs forming a labyrinthine seal between said lens and said base, at least one of said overlying sections being formed of a relatively resilient material to permit disengaging deflection thereof on application of an axial force, and means for applying a disengaging axial force to said base and lens on rotation of said lens relative to said base, said last-named means comprising cooperating cam surfaces on said second surfaces.

4. An automotive vehicle lamp comprising a base having a substantially cylindrical upstanding portion formed of a relatively resilient material, a lens having a substantially cylindrical downwardly extending rim portion formed of a substantially rigid material, said upstanding portion overlying said rim portion in the assembled position, said rim portion being provided with radially outwardly extending ribs, said upstanding portion being provided with grooves interengaging with said ribs forming a labyrinthine seal between said lens and said base, said relatively resilient upstanding portion permitting disengaging deflection thereof on application of an axial force to said lens, and means for applying a disengaging axial force to said base and lens on rotation of said lens relative to said base, said last-named means comprising a cam surface on said base and a cooperating cam surface on said lens.

5. An automotive vehicle lamp comprising a base formed of a relatively thick plastic composition material and having a relatively resilient cylindrical upstanding portion, a lens having a substantially cylindrical downwardly extending rim portion, said upstanding portion and said rim portion overlying one another in assembled position, said overlying portion being provided with interengaging ribs forming a labyrinthine seal between said lens and said base, said relatively resilient upstanding portion permitting disengaging deflection thereof on the application of an axial force to said lens, means for applying a disengaging axial force to said base and lens on rotation of said lens relative to said base, said last-named means comprising a cam surface on said base and a cooperating cam surface on said lens, a lamp bulb receiving socket section formed integrally with said base and means formed as part of said base defining a relatively thin resilient section of plastic composition material extending between said socket section and said relatively thick base material and surrounding said socket section to define the only interconnection between said socket section and said base, whereby said socket section is resiliently mounted to said base.

6. A lamp for supporting a bayonet bulb comprising a base member of plastic composition material, a half socket member folded integrally with said base member and having a semi-cylindrical recess and a longitudinal groove at the base thereof for slideably receiving and supporting a portion of a bulb base and one base pin of the bulb, a first conductive member secured to said molded half socket member and including a first spring finger disposed substantially diametrically opposite said longitudinal groove and having an aperture arranged to receive the other base pin of the bulb, and a second conductive member secured to said base member and having a second spring finger arranged to be contacted and deflected by the central contact of the bulb when said other base pin of the bulb is received in said first spring finger aperture.

7. The structure defined in claim 6 and further including a groove in said half socket member extending substantially parallel to said semi-cylindrical recess and laterally spaced therefrom to receive an insulated conductor having a bared end, said first conductor member including finger means extending into said groove and engageable with a conductor inserted in said groove to clamp the conductor in position and to establish electrical contact therewith.

8. An automotive vehicle lamp for supporting a bayonet bulb comprising a base member having a substantially cylindrical upstanding portion, a lens having a substantialy cylindrical downwardly extending rim portion, said upstanding portion and said rim portion adapted to overlie one another in the assembled position, said overlying portions being provided with interengaging ribs to form a labyrinthine seal between said lens and said base member, at least one of said overlying portions being formed of a relatively resilient material to permit disengaging deflection thereof on the application of an axial force, at least one cooperating cam surface on said base member and said lens for applying a disengaging axial force on rotation of said lens relative to said base, a half socket member molded integrally with said base member and having a semi-cylindrical recess and a longitudinal groove at the base thereof for slideably receiving and supporting a portion of a bulb base and one base pin of the bulb, a first conductive member secured to said molded half socket member and including a first spring finger disposed substantially diametrically opposite said longitudinal groove and having an aperture arranged to receive the other base pin of the bulb, and a second conductive member secured to said base member and having a second spring finger arranged to be contacted and deflected by the central contact of the bulb when said other base pin of the bulb is received in said first spring finger aperture.

9. For use in an automotive vehicle lamp, the combination comprising a base formed of a relatively thick plastic composition material, a lamp bulb receiving socket section molded integrally with and wholly above said base and means formed as part of said base defining a relatively thin resilient section of plastic composition material extending between said socket section and said relatively thick base material and surrounding said socket section to define the only interconnection between said socket section and said base, whereby said socket section is resiliently mounted to said base, said socket section including a recess and a groove for slidably receiving and supporting a portion of a bulb base and a base pin of the bulb, a first conductive member secured to said socket section for making electrical contact with the bulb base, and a second conductive member secured to said base and arranged to make electrical contact with the central contact of the bulb.

References Cited by the Examiner

UNITED STATES PATENTS

| 3,049,613 | 8/1962 | Baldwin | 240—7.1 |
| 3,066,218 | 11/1962 | Woodcock | 240—90 X |
| 3,114,182 | 12/1963 | Trautner et al. | 240—8.2 |
| 3,184,590 | 5/1965 | Nagel | 240—8.3 |
| 3,222,512 | 12/1965 | Dickson | 240—8.2 |

NORTON ANSHER, *Primary Examiner.*

C. R. RHODES, C. C. LOGAN, *Assistant Examiners.*